E. A. CHASE.

STONE CUTTING MACHINE.

APPLICATION FILED NOV. 15, 1909.

Reissued July 19, 1910.

13,134.

2 SHEETS—SHEET 1.

Witnesses:

C. F. Mason

E. M. Allen.

Inventor

E. A. Chase

By Attorney

Southgate & Southgate.

THE NORRIS PETERS CO., WASHINGTON, D. C

E. A. CHASE.

STONE CUTTING MACHINE.

APPLICATION FILED NOV. 15, 1909.

Reissued July 19, 1910.

13,134.

2 SHEETS—SHEET 2.

Witnesses:

C. F. Wesson

E. M. Allen.

Inventor

E. A. Chase.

by Attorneys

Southgate & Southgate

THE NORRIS PETERS CO., WASHINGTON, D. C.

UNITED STATES PATENT OFFICE.

ELROY A. CHASE, OF NORTHFIELD, VERMONT, ASSIGNOR, BY MESNE ASSIGNMENTS, TO AMERICAN GRANITE SAW COMPANY, OF KITTERY, MAINE, A CORPORATION OF MAINE.

STONE-CUTTING MACHINE.

13,134. Specification of Reissued Letters Patent. Reissued July 19, 1910.

Original No. 916,104, dated March 23, 1909, Serial No. 441,837. Application for reissue filed November 15, 1909. Serial No. 528,266.

*To all whom it may concern:*

Be it known that I, ELROY A. CHASE, a citizen of the United States of America, residing at Northfield, in the county of Washington and State of Vermont, have invented certain new and useful Improvements in Stone-Cutting Machines, of which the following is a full, clear, and exact specification.

This invention relates to improvements in machines for dividing stone blocks and its object is to provide a machine which will operate easily and by the use of which large blocks may be divided in a continuous operation and with a clean cut.

The invention consists in certain novel features of the apparatus illustrated in the accompanying drawings as will be hereinafter first fully described and then particularly pointed out in the claims.

Figure 1:
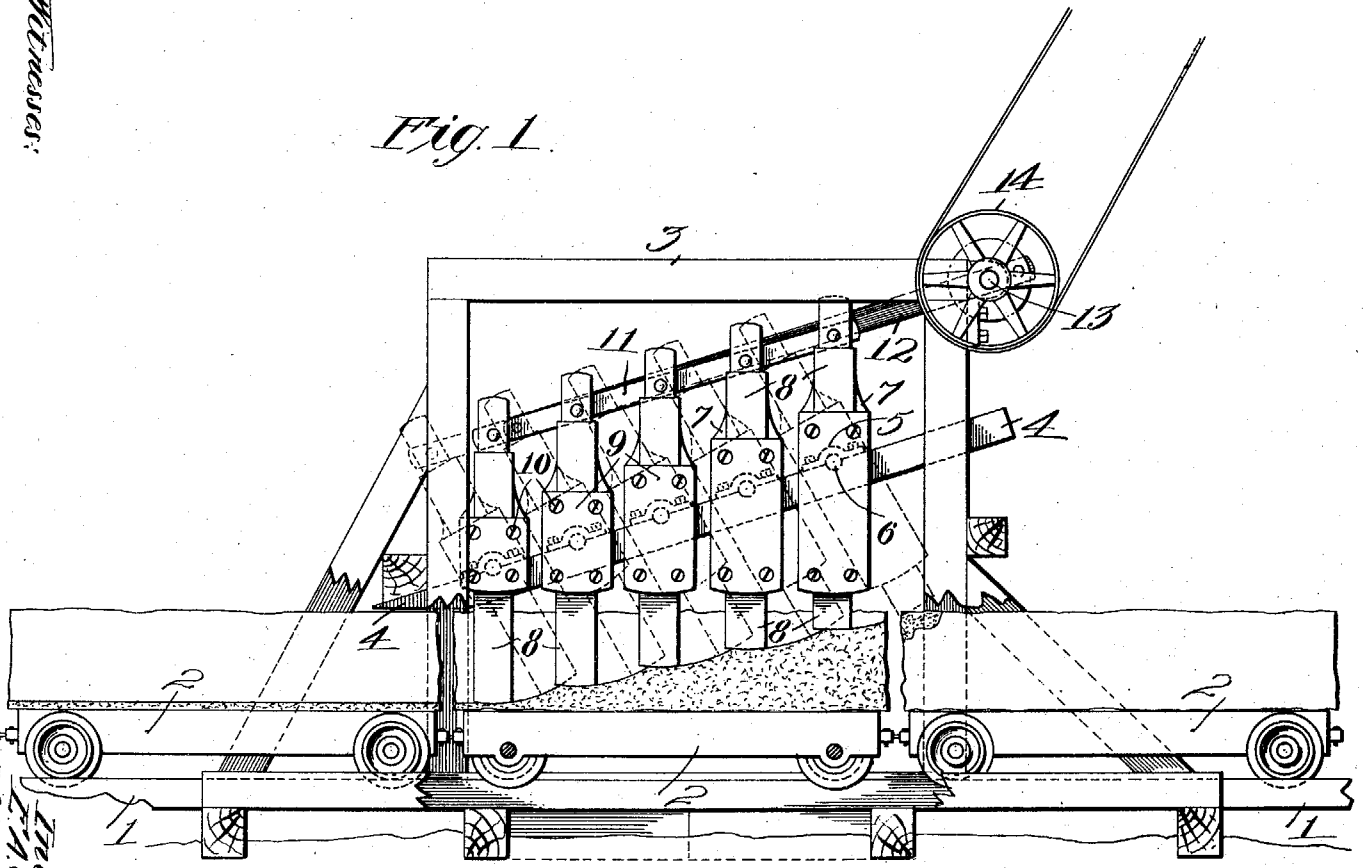
Figures 2, 3, 4:
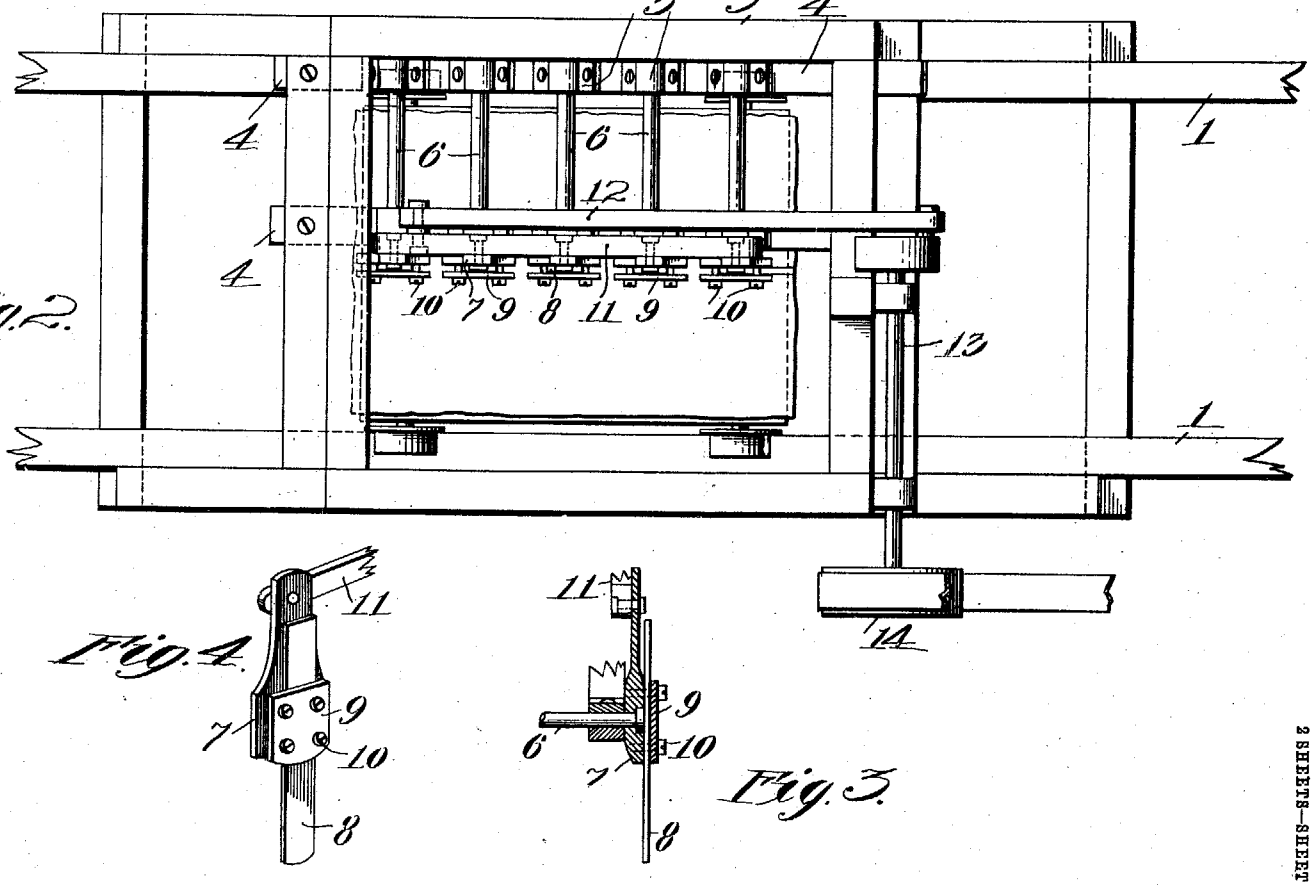

In the drawings, Figure 1 is a side elevation, with parts in section, of a machine embodying the invention; Fig. 2 is a plan view of a part of the apparatus; Fig. 3 is a detail section taken through one of the cutters and its shaft, and Fig. 4 is a detail perspective view of one of the cutters and its cutter head.

In carrying out this invention, a track 1, and a series of cars, trucks, or drays, 2, mounted on the track are employed. At a convenient point, a frame, 3, is erected to bridge the track and support the cutters and the operating mechanism, the cross beams of the frame being at such a height as to clear the trucks and the stones carried thereon. Upon the frame are a pair of inclined longitudinally disposed beams, 4, upon the upper sides of which are a series of journal boxes 5, in which are mounted shafts, 6, carrying cutter heads, 7, at their inner ends, the parts being so located that the blades, 8, carried by said heads will be disposed along the medial longitudinal line of the apparatus. The blades or cutters, it will be noticed, consist of long narrow steel plates and are held against the flat inner faces of the cutter heads by means of clamping plates 9, and bolts or other suitable fastenings, 10, inserted through the said clamping plates into the cutter heads. It will be observed that as the cutter heads are carried by the inner ends of the shafts 6 and the shafts are mounted upon the inclined beams, the cutter heads will be arranged so that each one will be higher than the one following it with the result that the cutters or blades will likewise form an inclined series to act on the block successively. The lower ends of the clamping plates are all arranged in approximately the same horizontal plane so as to clear the upper side of the block of stone being cut and the lower edge of each plate forms an arc so that it will not be brought into contact with the stone as it vibrates. The upper ends of the clamping plates are carried up above the pivotal point of the cutter head so as to securely clamp the blade and assure the oscillation of the same. This arrangement provides an extended bearing for the initial cutter which requires the most rigid holding while the succeeding cutters which cut deeper in the stone will be held by the walls of the kerf and do not require such a long clamping surface. The upper ends of the cutter heads are pivoted to a connecting bar, 11, to which is pivoted one end of a pitman, 12 which has its free end attached to a driving shaft, 13, mounted transversely on the frame and provided with a suitable band pulley, 14, which may receive motion from any suitable power plant.

The operation of the machine will be readily understood from the drawings and the foregoing description. The large blocks are loaded on the trucks or cars and the said cars or trucks are then drawn slowly over the track so as to pass under the cutters which are simultaneously vibrated by means of the driving shaft and the attached pitman. As the corner or edge of the stone comes into contact with the lower end of the first or highest vibrating cutter, the said cutter will bite into the stone so as to start a kerf therein into which abrading material will be fed by hand or by mechanical agents as may be convenient. As the kerf is formed and the stone advanced, the cut will be carried to the lowest point of the arc described by the cutter and the continued advance of the stone will then carry it into contact with the second cutter which will form a deeper cut. As the stone is carried through the machine each cutter will in turn act upon it until it will be cut through as it emerges from the range of the cutters.

Inasmuch as each cutterhead is carried by a separate shaft a light connecting bar is sufficient to transmit the driving power thereto and there is no necessity of employing a large heavy beam which would cause great friction. As the cutters are arranged to make successively deeper cuts it is not necessary to employ a large heavy vertically movable frame to feed the saws to the bottom of the kerf and the operation may be carried on continuously as it is not necessary to lift the saws after a stone is divided before starting the work on the next stone but the stones are fed through the apparatus to the saws without interruption as will be readily understood from Fig. 1 of the drawings. Furthermore, the cut may be as long as necessary, the length of the cut being limited only by the length of the track or the length of the stone. As the stone moves in a straight line under the cutters and the cutters are held rigidly against lateral motion by the cutterheads and the clamping plates, the cut through the stone will be straight and it will not be necessary to true the face of the cut after the stone is delivered. The cut may be carried more nearly through the bottom of the stone with my arrangement of cutters without fear of injury to the cutters or the cars than with any machine now known to me and it may be sufficiently flushed to prevent rust stains so that it will come from under the cutters thoroughly clean. As the clamping plate over the first cutters covers nearly the entire length of the same, the said cutter will be held very rigidly and will be forced to make a true cut as far as it goes into the stone, and each cutter is caused to follow in the cut made by the preceding cutter and is in turn held rigidly as far down as possible so that the finished cut will be perfectly true.

It will be observed upon reference to Fig. 1 that the arc described by each cutter overlaps or intersects the arc described by the preceding cutter. Consequently, a clean cut is made, the wear on the cutters is reduced to a minimum, and the friction of operation is practically overcome so that the machine may be driven rapidly with a small expenditure of power.

It will be observed that a characteristic feature of this invention lies in so constructing and arranging the cutting blades and the line of action or operation of the means for guiding the cars or supports under the cutters that a line drawn through the general plane of the cutting edges or extremities of the cutters will be inclined with respect to the line of action of the guiding means; that is, they will converge toward the rear end of the machine. I prefer accomplishing this result by the means illustrated, that is, by so mounting the cutters that their working portions shall gradually increase in length from the forward cutter to the rear cutter to bring the cutting extremities or lower edges of the blades to different horizontal planes, so that each cutter will work in the kerf formed by the preceding cutter or cutters and its lower cutting edge will work in its own horizontal zone or path through the stone. Then by having the cutters pivotally depend and by providing means for simultaneously vibrating them, each cutting edge cuts a curve or arc as the stone is progressively presented to the cutters and this greatly augments the action of the abrading material.

By using a series of separately arranged cutters swinging back and forth, which cutters preferably operate synchronously and which cutters preferably are independently pivoted, the results above specified will be obtained. It also will be noted that the distance between two pivots of the cutters is less than the distance from the pivots to the ends of the blades, whereby the cutters can be very closely arranged and a large number of cutters can operate on the same stone. It also will be noted that the line of the pivots of the cutters is arranged so that the feed will take place at an angle thereto; that is, in the construction illustrated, the pivots are arranged on an inclined line and the feed takes place on a horizontal line. These arrangements make a simple and compact machine.

By the arrangements described, the abrading material will be presented by the ends of the cutters on both forward and backward movements, and the same will gradually work out through the slot in the stone.

While I have illustrated and described a preferred embodiment of the invention I am aware that many modifications can be made therein by any person skilled in the art without departing from the scope of the invention as expressed in the claims. Therefore, I do not wish to be limited to all the details of constructions shown or described, but What I do claim is:—

1. In a stone cutting machine, the combination of a series of cutters separately arranged edgewisely in alinement, means for swinging the cutters back and forth edgewisely synchronously, and means whereby a relative feed movement may be effected between the cutters and the stone.

2. In a stone cutting machine, the combination of a series of cutters consisting of flat blades independently pivoted edgewisely in alinement, means for vibrating these cutters synchronously edgewisely on their pivots, and means whereby a relative feed movement may be effected between the cutters and stone.

3. In a stone cutting machine, the combination of a series of cutters consisting of flat blades pivoted edgewisely in alinement, the distance between two pivots of the cutters being less than the distance from the pivots to the ends of the blades, means for vibrating these cutters forward and backward edgewisely, and means whereby a relative feed movement may be effected between the cutters and stone.

4. In a stone cutting machine, the combination of a series of cutters consisting of flat blades independently pivoted edgewisely in alinement, means for vibrating these cutters edgewisely, and means whereby a relative feed movement may be effected between the cutters and stone, the lower or cutting ends of the cutters being relatively arranged in such proximity that abrasive material will be presented by the ends of the cutters on both forward and backward movements.

5. In a stone cutting machine, the combination of a series of cutters consisting of flat blades independently pivoted edgewisely in alinement, means for vibrating these cutters edgewisely, and means whereby a relative feed movement may be effected between the cutters and stone on a line at an angle to the ends of the cutters so that they will make successively deeper cuts, the lower cutting ends of the cutters being relatively arranged in such proximity that abrasive material will be presented by the ends of the cutters on both their forward and backward movements and so that the abrasive material will work gradually down into the deepest cut.

6. In a stone cutting machine, the combination of a series of cutters consisting of flat blades independently pivoted edgewisely in alinement, means for vibrating these cutters edgewisely, and means whereby a relative feed movement may be effected between the cutters and stone on a line at an angle to the pivots of the cutters.

7. In a stone cutting machine, the combination of a series of cutters consisting of flat blades independently pivoted edgewisely in alinement on an inclined line, means for vibrating these cutters edgewisely, and means whereby a relative feed movement may be effected between the cutters and stone along a horizontal line.

8. In a stone cutting machine, the combination of a series of cutters independently arranged edgewisely in alinement, means for swinging the cutters back and forth edgewisely on curved lines, the ends of the cutters being shaped to equal arcs, and means whereby a relative feed movement may be effected between the cutters and stone.

9. In a stone cutting machine, the combination of a series of cutters independently arranged edgewisely in alinement, and means for swinging the cutters back and forth edgewisely so that the curve described by each cutter will intersect the curve described by the adjacent cutter.

10. In a stone cutting machine, the combination of a frame, a series of cutters pivoted thereto on an inclined line, and a reciprocating pitman for operating said cutters, said pitman operating substantially parallel to the line of said pivots.

11. In a stone cutting machine, the combination of a series of swinging cutters comprising heads, cutter blades of various lengths carried by said heads, means for swinging the cutters back and forth, and means whereby a relative feed movement may be effected between the cutters and stone, the lower ends of the cutter heads being arranged on a line substantially parallel with the stone so as to support the blades close to the stone.

12. In a stone cutting machine, the combination of a series of swinging cutters having their lower cutting ends arranged in different horizontal planes, and means for operating said cutters, the arc described by each cutter intersecting the arc described by the adjacent cutter.

13. The combination of a frame having inclined beams, a series of shafts supported on said beams, cutters carried by the ends of said shafts, and means for rocking said shafts.

14. The combination of a frame having inclined beams, a series of shafts journaled on said beams and having cutter heads at their inner ends, a connecting bar pivotally attached to the upper end of each cutter head, a pitman pivoted to said connecting bar, means for actuating said pitman, a cutter placed against the inner face of each cutter head, and clamping plates secured to the cutter heads over the cutters.

15. The combination of the cutter heads, cutters placed against the cutter heads with their lower cutting ends in different horizontal planes, and clamping plates secured to the cutter heads over the cutters, with the ends of all the clamping plates in substantially the same horizontal plane and their upper ends in successively different horizontal planes corresponding to the positions of the cutters.

In testimony whereof I have signed this specification in the presence of two attesting witnesses.

ELROY A. CHASE.

Witnesses:
E. M. Allen,
C. F. Wesson.